United States Patent [19]
Van Wyk

[11] 3,755,164
[45] Aug. 28, 1973

[54] BEARING COMPOSITION
[75] Inventor: Jan W. Van Wyk, Kirkland, Wash.
[73] Assignee: The Boeing Company, Seattle, Wash.
[22] Filed: Apr. 24, 1972
[21] Appl. No.: 246,656

[52] U.S. Cl. .................................................. 252/12
[51] Int. Cl. .............................................. C10m 7/02
[58] Field of Search .................... 252/12, 12.2, 12.4, 252/12.6

[56] References Cited
UNITED STATES PATENTS
| | | | |
|---|---|---|---|
| 2,294,404 | 9/1942 | Hensel et al. | 252/12.2 |
| 2,854,597 | 9/1958 | Foote et al. | 252/12.2 |
| 3,020,056 | 2/1962 | Agens | 252/12 |
| 3,081,196 | 3/1963 | MacDonald | 252/12 |
| 3,419,363 | 12/1968 | Sliney | 252/12 |
| 3,429,720 | 2/1969 | Houston et al. | 252/12 |
| 3,508,955 | 4/1970 | Sliney | 252/12.2 |

Primary Examiner—Daniel E. Wyman
Assistant Examiner—I. Vaughn
Attorney—Morris A. Case

[57] ABSTRACT

A self-lubricating solid bearing having oxidation resistant lubricants of aluminum phosphate, barium fluoride and calcium fluoride, dispersed throughout a matrix of silver containing an additive selected from aluminum oxide, silicon nitride or molybdenum silicide to give a bearing operable at elevated temperatures.

5 Claims, No Drawings

BEARING COMPOSITION

BACKGROUND OF THE INVENTION

This invention provides a solid self-lubricating bearing material that may be used as a bearing in an oxidizing environment at temperatures in excess of 1,000°F.

A solid lubricant compact material containing molybdenum disulfide as the lubricant is used in many successful applications up to a temperature near 750°F at which point the molybdenum disulfide starts to oxidize.

For use at higher temperatures self-lubricating oxidation resistant materials such as barium, calcium or magnesium fluorides are effective. These lubricants are often used as a coating to a metal substrate, and a low coefficient of friction is obtained at elevated temperatures, however, once the coating wears through friction increases and rapid wearing takes place.

These oxidation resistant materials are also impregnated into a porous metal base by vacuum impregnating with the melted metal fluorides. The solid oxidation resistant lubricant being distributed throughout the porous metal. The porous metal provides only structural strength and results in friction increase.

These lubricants may be distributed throughout a metal matrix by powder metallurgy technique of hot pressing or pressing and sintering the premixed metal and lubricant powders. Areas of exposed lubricant furnish the sliding surface and as the surface wears new lubricant is continually exposed. The matrix used in the present invention in combination with an oxidation resistant solid lubricant has better wear characteristics than the solid lubricant alone.

SUMMARY OF THE INVENTION

A self-lubricating solid bearing material is prepared using the powder metallurgy techniques of premixing powdered ingredients then subjecting the premixed powder to pressure and heat.

The product being a compacted solid bearing material with an oxidation resistant solid lubricant dispersed throughout a metal matrix which also has a filler material for strength and wear resistance. The oxidation resistant solid lubricant being aluminum phosphate, barium fluoride and calcium fluoride. The metal matrix is silver. The ratio by weight of oxidation resistant solid lubricant to silver ranges from about 1:4 to 1:10. The filler material is selected from aluminum oxide, silicon nitride and molybdenum silicide and ranges from about 5 to 10 weight percent of the total compound.

This bearing material may be used as a self-lubricating bearing material from ambient up to about 1,500°F. It has particularly good wearing characteristics from about 750°F to about 1,200°F.

It is an object of this invention to provide a self-lubricating oxidation resistant bearing material for use at elevated temperatures.

It is another object of this invention to provide a self-lubricating solid bearing material for use at temperatures above 750°F.

Other objects and advantages of the foregoing invention will be apparent to one skilled in the art from the following disclosures and discussions.

DESCRIPTION OF PREFERRED EMBODIMENTS

Solid lubricant specimens containing oxidation resistant solid lubricants, a metal and a filler were prepared using conventional powder metallurgy techniques. Compounds in the powdered condition were mixed then compacted at elevated temperatures in graphite dies. The specimens were hot pressed as discs in a two-inch graphite die at temperatures ranging from 1,500°F to 1,900°F with a 5,000 p.s.i. press load. The resulting discs were machined into rectangular bars and were subjected to a flexural test by supporting the bar on two knife edges and loading it centrally in a Tinius-Olsen test machine. The breaking load was converted to flexural strength using the standard beam formula.

Wear test specimens were fabricated from broken halves of the flexural test bars. These rectangular shaped specimens, about 0.125 inches in width, are held by an insulated arm with a pressure of 3½ pounds forcing the specimen against a 2½ inch diameter shaft rotating at 18 RPM.

The test starts with the simultaneous initiation of shaft rotation and the introduction of heat to the shaft. The shaft is heated up to 1,000°F in two hours, on up to 1,200°F in two more hours and held at 1,200° for an additional hour for a total of five hours of test. The wear scar length and specimen width is used to calculate wear volume. The wear volume is converted to wear rate per 100 minutes of run.

Aluminum phosphate, barium fluoride and calcium fluoride in various combination have good wearing characteristics at elevated temperatures. These oxidation resistant self-lubricating materials exhibit especially good characteristics when used in amounts of 6 percent $AL_2PO_4$, 48.8 percent $BaF_2$ and 45.6 percent $CAF_2$. This mixture called "ABC" mix is used for the oxidation resistant solid lubricant. This mixture may not be used alone as a self-lubricating bearing material as it has such low strength. The ABC mixture was used in combination with many metal matrixes and it was found that an ABC dispersion in a matrix of silver exhibited better wearing properites than the ABC mixture alone. This is shown in Table I

TABLE I

| ABC Gm | AG Gm | FLEXURAL STRENGTH p.s.i. | WEAR RATE $1N^3 \times 10^{-6}/100$ Min. |
|---|---|---|---|
| 15 |  | 3,202 | 189.37 |
| 7.5 | 30 | 15,887 | 22.73 |

All specimens shown in Table I and all specimens shown in the following tables were prepared with the powder metallurgical techniques shown above and the flexural and wear tests on all the specimens are as described above.

Oxidation resistant materials such as oxides, barides, carbides, silicides and nitrides when used in combination with an ABC dispersion in silver matrix increase the strength of the matrix and in some combinations enhance the wear rate. Aluminum oxide, molybdenum silicide and silicon nitride in amounts of from about 5 to 10 percent by weight of the overall composition are particularly effective as shown by Table II.

TABLE II

| ABC Gm | AG Gm | $AL_2O_3$ Gm | $MoSi_2$ Gm | $Si_3N_4$ Gm | Flexural Strength | Wear rate $1N^3 \times 10^{-6}/100$ Min. |
|---|---|---|---|---|---|---|
| 7.5 | 30 | 4 |  |  | 29,576 | 1.64 |
| 7.5 | 30 | 2 |  |  | 28,767 | 1.06 |
| 7.5 | 30 |  | 4 |  | 32,170 | 2.30 |
| 7.5 | 30 |  | 2 |  | 27,314 | 2.67 |
| 7.5 | 30 |  |  | 4 | 17,281 | 2.52 |
| 7.5 | 30 |  |  | 2 | 28,655 | 1.78 |

Based upon the results shown in Table II additional test specimens were prepared to test the effect of varying the ratio of ABC to silver when using aluminum oxide as the filler material and it was found the ratio of ABC to silver may vary from about 1:4 up to 1:10 and still have excellent wear qualities as shown in Table III. A ratio of from about 1:6 to 1:7 is a preferred ratio. Reducing the percentage of aluminum oxide below 5 weight percent of the composition caused an increase in the wear rate.

TABLE III

| ABC Gm | AG Gm | AL$_2$O$_3$ Gm | FLEXURAL STRENGTH p.s.i. | WEAR RATE 1N$^3$×10$^{-6}$/100 Min. |
|---|---|---|---|---|
| 7.50 | 30.00 | 2 | 26,323 | 1.30 |
| 5.36 | 32.14 | 2 | 32,429 | 1.03 |
| 4.17 | 33.33 | 2 | 33,260 | 1.96 |
| 3,41 | 34.09 | 2 | 34,024 | 2.42 |
| 3.41 | 34.09 | 1 | 20,305 | 9.43 |

A preferred embodiment as shown by these tests would be a composition with the following percentage by weight of compounds, 0.8 percent aluminum phosphate, 6.6 percent barium fluoride, 6.2 percent calcium fluoride, and 5 percent AL$_2$O$_3$ dispersed in a 81.4 silver matrix.

Specimens were prepared using the powder metallurgy techniques but with other means than in air hot pressing. The heat and pressure were applied using vacuum hot pressing, hot rolling and hot isostatic pressing. Variations in flexural strength and in wear rate were found by use of these different processes, however, all these processes produced satisfactory oxidation resistant self-lubricating solid bearing materials when the compositions and percentages of materials disclosed herein were used.

It will be appreciated that various modifications may be made without departing from the spirit of this invention or the scope of the following claims.

I claim:

1. A self-lubricating solid bearing material for use at temperatures above 750°F comprising: an oxidation resistant self-lubricating mixture of aluminum phosphate, barium fluoride and calcium fluoride; a filler compound selected from the group of materials consisting of aluminum oxide, silicon nitride, and molybdenum silicide dispersed throughout; a matrix of silver wherein the ratio by weight of oxidation resistant self-lubricating material to silver ranges from about 1:4 to 1:10 and the weight percent of the filler compound is about 5 to 10 percent of the total composition.

2. A self-lubricating solid bearing material for use above 750°F comprising: a combination of oxidation resistant aluminum phosphate, barium fluoride and calcium fluoride in weight percent relation to each other of about 6 percent aluminum phosphate, about 48.4 percent barium fluoride and about 45.6 percent calcium fluoride, silver in the ratio of about 1:4 to 1:10 parts by weight of oxidation resistant materials to silver; and a compound selected from the group of materials consisting of aluminum oxide, silicon nitride, and molybdenum silicide in an amount of from about 5 to 10 weight percent of total composition.

3. A self-lubricating solid bearing material as in claim 2, wherein the compound is aluminum oxide.

4. A self-lubricating solid bearing material for use at temperatures above 750°F comprising: a combination of oxidation resistant aluminum phosphate, barium fluoride and calcium fluoride in weight relation to each other of about 6 percent aluminum phosphate, about 48.4 percent barium fluoride and about 45.6 percent calcium fluoride; silver in the ratio of about 1:6 to 1:7 parts by weight of oxidation resistant materials to silver and a compound selected from the group of materials consisting of aluminum oxide, silicon nitride, and molybdenum silicide in the amount of from about 5 to 9 weight percent of the total composition.

5. A self-lubricating solid bearing material for use at high temperatures comprising: about 0.8 percent aluminum phosphate, about 6.6 percent barium fluoride, about 6.2 percent calcium fluoride, and about 5.0 percent aluminum oxide with these compounds dispersed throughout a silver matrix comprising about 81.4 percent of the bearing material.

* * * * *